United States Patent
Baloch et al.

(10) Patent No.: US 9,348,571 B2
(45) Date of Patent: May 24, 2016

(54) METHOD, DEVICE, AND PROGRAM STORAGE DEVICE FOR AUTONOMOUS SOFTWARE LIFE CYCLE MANAGEMENT

(71) Applicant: General Electric Company, Schenectady, NY (US)

(72) Inventors: Ghulam Ali Baloch, Albany, NY (US); Bradford Wayne Miller, Malta, NY (US); Chung Hee Hwang, Malta, NY (US); Viktor Holovashchenko, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/468,022

(22) Filed: Aug. 25, 2014

(65) Prior Publication Data
US 2016/0055072 A1    Feb. 25, 2016

(51) Int. Cl.
*G06F 9/445*    (2006.01)
*G06F 11/36*    (2006.01)
*G06F 11/34*    (2006.01)

(52) U.S. Cl.
CPC .. *G06F 8/60* (2013.01); *G06F 8/61* (2013.01); *G06F 8/67* (2013.01); *G06F 11/3409* (2013.01); *G06F 11/368* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 6,151,643 A | 11/2000 | Cheng et al. | |
| 6,314,565 B1 | 11/2001 | Kenner et al. | |
| 6,347,398 B1 | 2/2002 | Parthasarathy et al. | |
| 7,844,963 B2 | 11/2010 | Pitzel et al. | |
| 8,176,483 B2 | 5/2012 | Hoeffler et al. | |
| 8,578,376 B2 | 11/2013 | Natchadalingam et al. | |
| 8,634,539 B2 | 1/2014 | Grannan et al. | |
| 2004/0031052 A1* | 2/2004 | Wannamaker | A63F 13/12 725/61 |
| 2004/0060044 A1 | 3/2004 | Das et al. | |

(Continued)

OTHER PUBLICATIONS

Seacord, Robert C., et al., "AGORA: A Search Engine for Software Components", 1998, pp. 62-70.*

(Continued)

*Primary Examiner* — Thuy Dao
*Assistant Examiner* — Christopher Franco
(74) *Attorney, Agent, or Firm* — Schwegman Lundberg & Woessner, P.A.

(57) ABSTRACT

A method of searching for and installing a software product on a device is provided. One or more capabilities needed by the device to be served by a software product are determined. The one or more capabilities needed by the device are communicated from a software life cycle management agent on the device to a yellow pages agent outside the device, the communicating comprising formulating a request comprising a list of the capabilities encoded in a description language that defines the capabilities semantically. Then locations of one or more software products matching the one or more capabilities needed by the device may be received from the yellow pages agent. One of the one or more software products to install may be selected based on automatically evaluated criteria. Then the selected software product may be downloaded using its received location, and the selected software product may be installed on the device.

14 Claims, 9 Drawing Sheets

(56) References Cited

U.S. PATENT DOCUMENTS

| | | | | |
|---|---|---|---|---|
| 2008/0196020 A1* | 8/2008 | Clinton | G06F 8/65 | 717/172 |
| 2009/0210870 A1* | 8/2009 | Clark | G06F 9/445 | 717/178 |
| 2009/0288079 A1* | 11/2009 | Zuber | G06F 21/51 | 717/176 |
| 2010/0131943 A1* | 5/2010 | Sreekanth et al. | G06F 8/61 | 717/176 |
| 2011/0087692 A1* | 4/2011 | Masone | G06F 8/60 | 707/769 |
| 2012/0011083 A1 | 1/2012 | Storms et al. | | |
| 2012/0059805 A1* | 3/2012 | Bhogal | G06F 8/63 | 707/694 |
| 2012/0184255 A1* | 7/2012 | Macaluso | G06F 8/63 | 455/414.3 |
| 2012/0290441 A1* | 11/2012 | Mahaniok | G06F 8/60 | 705/26.62 |
| 2013/0185292 A1* | 7/2013 | Li | G06F 17/30522 | 707/723 |
| 2013/0318498 A1* | 11/2013 | Mittal | G06F 9/44 | 717/124 |
| 2014/0007070 A1* | 1/2014 | Huang | G06F 8/65 | 717/170 |
| 2014/0298293 A1* | 10/2014 | Nishio | G06F 8/71 | 717/121 |

OTHER PUBLICATIONS

Ahsan, Syed Nadeem, et al., "A Database for the Analysis of Program Change Patterns", 2008, pp. 32-39.*

Niu, Nan, et al., "Automatic Labeling of Software Requirements Clusters", 2012, pp. 17-20.*

Janjic, Werner, et al., "Leveraging Software Search and Reuse with Automated Software Adaptation", 2012, pp. 23-26.*

Xu, Jing, "Rule-based automatic software performance diagnosis and improvement", 2009, pp. 525-550.*

Lim, Soo Ling, et al., "Investigating App Store Ranking Algorithms using a Simulation of Mobile App Ecosystems", 2013, pp. 2672-2679.*

Marr, B., et al., "Automating the balanced scorecard—selection criteria to identify appropriate software applications", Measuring Business Excellence, 7, (2003), 29-36.

* cited by examiner

METHOD, DEVICE, AND PROGRAM STORAGE DEVICE FOR AUTONOMOUS SOFTWARE LIFE CYCLE MANAGEMENT

TECHNICAL FIELD

This application relates generally to software development and testing. More particularly, this application relates to an agent for autonomous software life cycle management.

BACKGROUND

Software life cycle management refers to the governance, development, and maintenance of computer software. Specifically, it typically encompasses requirements management, software architecture, computer programming, software testing, software management, change management, product management, and release management. The "life cycle" referred to involves the complete life of a software product, from design stages to distribution and release to maintenance.

While certain aspects of software life cycle management have been automated, it is still a largely manual process. For example, when testing computer software, a developer may utilize testing tools to help create test scenarios for the software, but the decisions as to which environments and configurations/settings to test are determined by a human. Furthermore, while tools exist to aid in update management, such as an automated tool that checks for an updated version of a software product every time the software product is run, such update management tools are limited in that they are only able to make a determination as to whether to update one particular software product with a newer version of the same software product. They are unable to, for example, determine when a different software product may be appropriate based on changed needs and/or changed capabilities of various software products.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Overview

Figure 1:
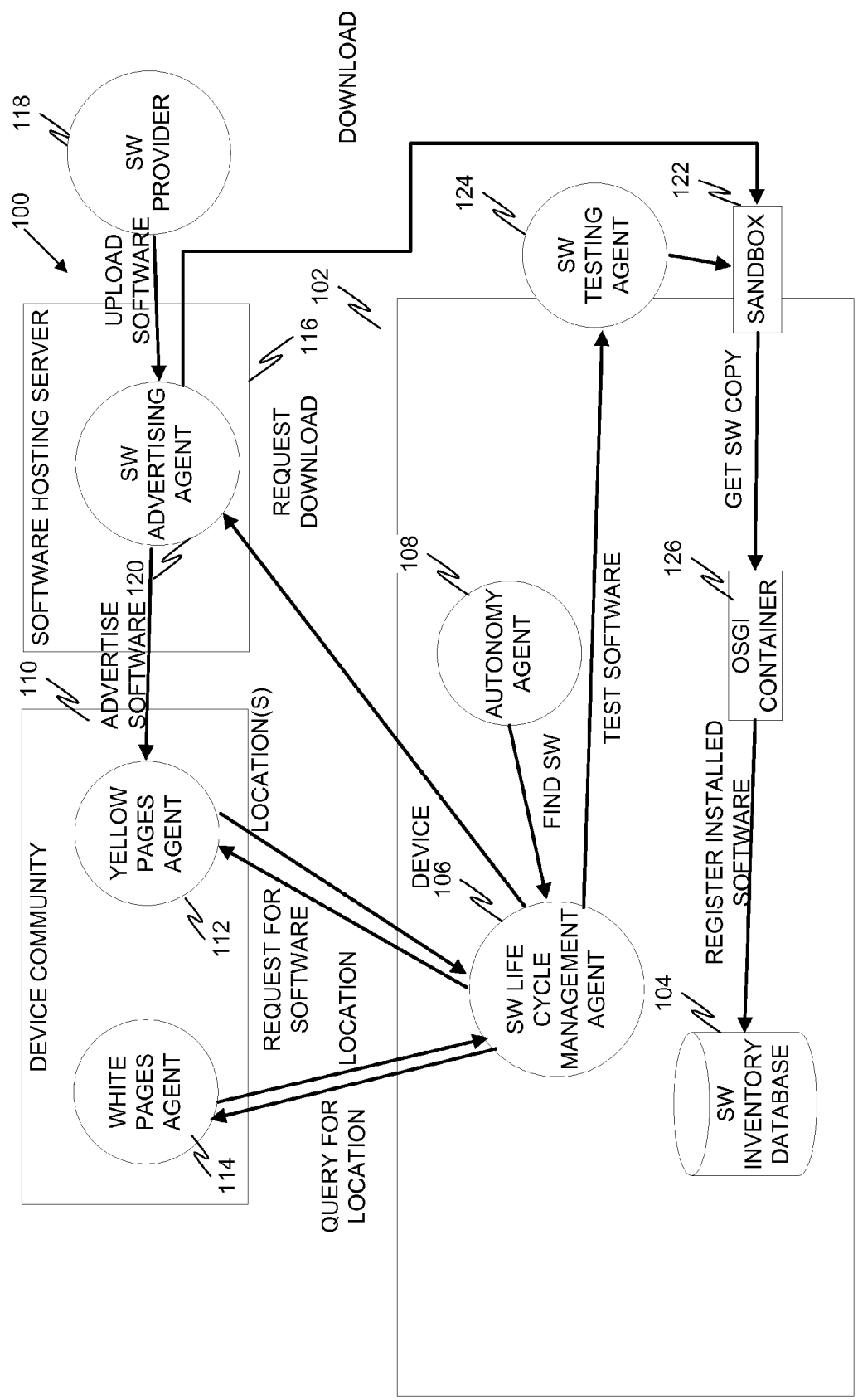
FIG. 1 is a block diagram illustrating a system in accordance with an example embodiment.

The description that follows includes illustrative systems, methods, techniques, instruction sequences, and machine-readable media (e.g., computing machine program products) that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, an autonomous software life cycle management agent is provided with the technical effect of enabling the self-testing, self-healing, self-reporting, and self-configuration of a software product. Working through an autonomous agent on a device, the device is able to self-describe its needs to software providers. Upon getting informed about available software that addresses the described needs of the device, the device is able to download software (either immediately or scheduled for a later time). The device is also able to automatically test software features in a sandbox and make a decision as to whether to install the software. If such as decision is affirmative, then the device is able to self-install the software. A sandbox is a testing environment that isolates untested code changes and experimentation from a production environment or repository. Sandboxes typically replicate at least the minimal functionality needed to accurately test the programs or other code under development (e.g., usage of the same environment variables as, or access to an identical database to be used by, the stable prior implementation intended to be modified).

Traditionally software life cycle management is performed by a human user manually downloading software, installing it on a device (either a target device or a replica device), testing the software and then pushing the software to target devices. This approach is time consuming, error prone, and costly. In an example embodiment, the autonomous software life cycle management agent described herein reduces these drawbacks. It is able to perform its functions with limited or no human supervision, which avoids human errors, reduces the costs associated with utilizing human resources, and eliminates infrastructure needed to log information of all the assets. In another example embodiment, there are also minimal disruptions to the device/user operations, as devices decide for themselves an appropriate time to perform software life cycle management, and whether it is beneficial to even perform the life cycle operations. Additionally, in an example embodiment, new software is tested on the actual device it is intended for and not a replica device. Further, software is tested in an isolated environment, so if errors are encountered, there is no need to perform any rollbacks.

In an example embodiment, an autonomous software life cycle agent is provided that searches for a service or software that fulfills certain needs. The needs may be described in a semantic language. The software/service provider may or may not be known to the device. Indeed, the name of the software/service may not even be known to the device. Rather, the autonomous software life cycle agent may simply know what it wants the software/service to do.

In an example embodiment, an autonomous software life cycle agent is provided that searches for an update based on an updated set of capabilities, rather than on a strict "is there a newer version to this particular software product"-basis. It is not the currently installed software that is performing the search, it is the autonomous software life cycle agent. This allows for the possibility that the most appropriate update to a software product is actually to switch to a competitor's product. This also allows for factors other than the availability of a new software version to affect a decision as to whether or not to upgrade or switch to new software. Such factors may include, for example, a hardware upgrade specifying a new set of capabilities on the part of the software product.

In an example embodiment, the autonomous software life cycle agent is also able to get informed about updated versions by receiving an indication of updated capabilities of software. This allows for a scenario where, for example, the device was looking for capabilities for which it couldn't find a good match and settled on a software product with limited capabilities, while the autonomous software life cycle agent causes instructions to be indicated to one or more servers to inform the autonomous software life cycle agent when a software/service with the desired capabilities becomes available.

There may be instances where more than one software product may be suitable for meeting the needs of the device as described by the autonomous software life cycle agent. In an example embodiment, the autonomous software life cycle agent is then able to make a choice among the multiple matches, based on capabilities desired and constraints imposed.

In an example embodiment, a technical effect is that the autonomous software life cycle agent is able to make a decision as to whether or not it is beneficial to upgrade to a new version of a software product/service and/or switch to a different software product/service. This decision may be based on many factors, including, for example, upgraded features, service provider credibility, resources needed to run the updated version, and cost.

In another example embodiment, the autonomous software life cycle agent is able to interact with a test bed and evaluate test results to make a decision as to whether or not to trust the software, which ultimately affects the autonomous software life cycle agent's decision as to whether to install the software product.

FIG. 1 is a block diagram illustrating a system 100 in accordance with an example embodiment. The system 100 includes a device 102 on which a software product may be executed. The device 102 may include a software inventory database 104 where one or more software product installed on the device 102 may be stored. A software life cycle management agent 106 may act to locate appropriate software for download, testing, and possible installation on the device 102. An autonomy agent 108 may act as a manager in the device 102 to define and execute various goals for the device 102.

Based on instructions from the autonomy agent 108, the software life cycle management agent 106 may act to query or subscribe to a device community 110 for information about available software. The device community 110 may include a yellow pages agent 112. A yellow pages agent is a module or component that organizes information (in this case available software) based on category and/or capability. The device community 110 may also include a white pages agent 114. A white pages agent is a module or component that organizes information (in this case available software) based on title or other identification.

The software products and/or new versions that are capable of being downloaded may be hosted on a software hosting server 116. A software provider 118 may upload the software products and/or new versions to the software hosting server 116. In an example embodiment, the software provider 118 may also provide a detailed listing of the capabilities/functionality of the software product/new version when it is uploaded. This detailed listing may take the form of a software metadata file that accompanies the software product.

In an example embodiment, the software hosting server 116 may advertise the availability of the software product/new version. This may be performed by a software advertising agent 120, which may maintain a list of subscriptions of various software life cycle management agents, including, for example, software life cycle management agent 106.

In an example embodiment, communication between the software life cycle management agent 106 and the device community 110 and/or software hosting server 116 may be performed via the Message Transport Service (MTS). MTS may provide a protocol that allows software product capabilities and/or device requirements to be described semantically. This means that, for example, a list of the capabilities and/or device requirements is encoded in a description language that defines the capabilities semantically. For example, if a desired capability is the ability to edit text on a computer display, this characteristic may be defined by the description language as a possible value for a variable of the description language. The communication itself may take a number of forms.

As described earlier, the software advertising agent 120 may advertise new software products and/or new versions of existing software products. This may include, for example, communicating capabilities of the new software products and/or new versions of existing software products to the software life cycle management agent 106, which may have previously subscribed to receive such advertisements. The subscriptions may either be general (e.g., "send me information about any new software you receive") or specific (e.g., "send me information about new versions of software X," "send me information about new software products having the following capabilities . . . ").

Additionally, the software life cycle management agent 106 may generate direct queries to the yellow pages agent 112 and/or white pages agent 114 to proactively locate software products meeting various requests and/or requirements of the device 102. The yellow pages agent 112 and/or white pages agent 114 may send results to the software life cycle management agent 106 in the form of locations of one or more software products on the software hosting server 116. The software life cycle management agent 106 may then utilize this location information to initiate a download of appropriate software products. It should be noted that while a single software hosting server 116 is depicted in FIG. 1, in some example embodiments there may be a plurality of different software hosting servers and the yellow pages agent 112 and/or white pages agent 114 may provide the location of not just where a particular software product can be found within a single software hosting server, but also a location of the software hosting server hosting the software product (as well as any other instructions needed by the software life cycle management agent 106 to download the software product).

In some example embodiments, the yellow pages agent 112 and/or white pages agent 114 may provide information about a software product to the software life cycle management agent 106. This information may include a name of the software product and additional details about the software product (e.g., manufacturer, version number, date of creation). In another example embodiment, the software life cycle management agent 106 is never informed of information about the software product other than its location and/or information needed to download the software product. In other words, the device 102 may be kept in the dark as to what the software product is, and instead rely on the device community 110 to provide an appropriate software product that matches the desired capabilities. This same anonymity may also be extended in the other direction: namely, the software hosting server 116 may not be made aware of the device 102 and/or any characteristics of the device 102.

Once the software product/version is selected by the software life cycle management agent 106 and downloaded, it may be run in a sandbox 122 on the device 102. Execution of the software product/version in the sandbox 122 allows it to be tested on the device 102 without causing any runtime or other issues or errors in the device 102. The testing may be performed by a software testing agent 124, which may be instructed to perform the testing by the software life cycle management agent 106 and then may inform the software life cycle management agent 106 of the results of the tests. The software life cycle management agent 106 can then make a decision as to whether or not to install the software product/version based on the results of the testing.

In an example embodiment, installation and use of the software product/version may be performed using an Open Service Gateway Initiative (OSGi) container. OSGI is a specification that describes a modular system and service platform for the Java description language that implements a dynamic component mode. Applications or components, in the form of bundles for deployment, can be remotely installed, started, stopped, updated, and uninstalled without requiring a reboot. The OSGi container 126 for a software product/version can describe all that is needed in order to successfully install the software product/version.

In an example embodiment, the architecture described above is implemented on top of a Java Agent Development Framework (JADE). Additionally, an agent communication language (ACL) may be provided to enable the communications between the various agents, including the software life cycle management agent 106, autonomy agent 108, yellow pages agent 112, white pages agent 114, software advertising agent 120 and software testing agent 124.

It should be noted that the software life cycle management agent 106 and autonomy agent 108 work together to operate the various functions of coordinating the determination to search/subscribe to new software products and/or versions, coordinate the testing of the new software products and/or versions, and decide ultimately which software products and/or version to install on the device 102. In various example embodiments, the precise functionality performed by each of the software life cycle management agent 106 and autonomy agent 108 may differ, and nothing in this disclosure shall be interpreted as limiting the functionality to only being performed by one or the other.

Figure 2:
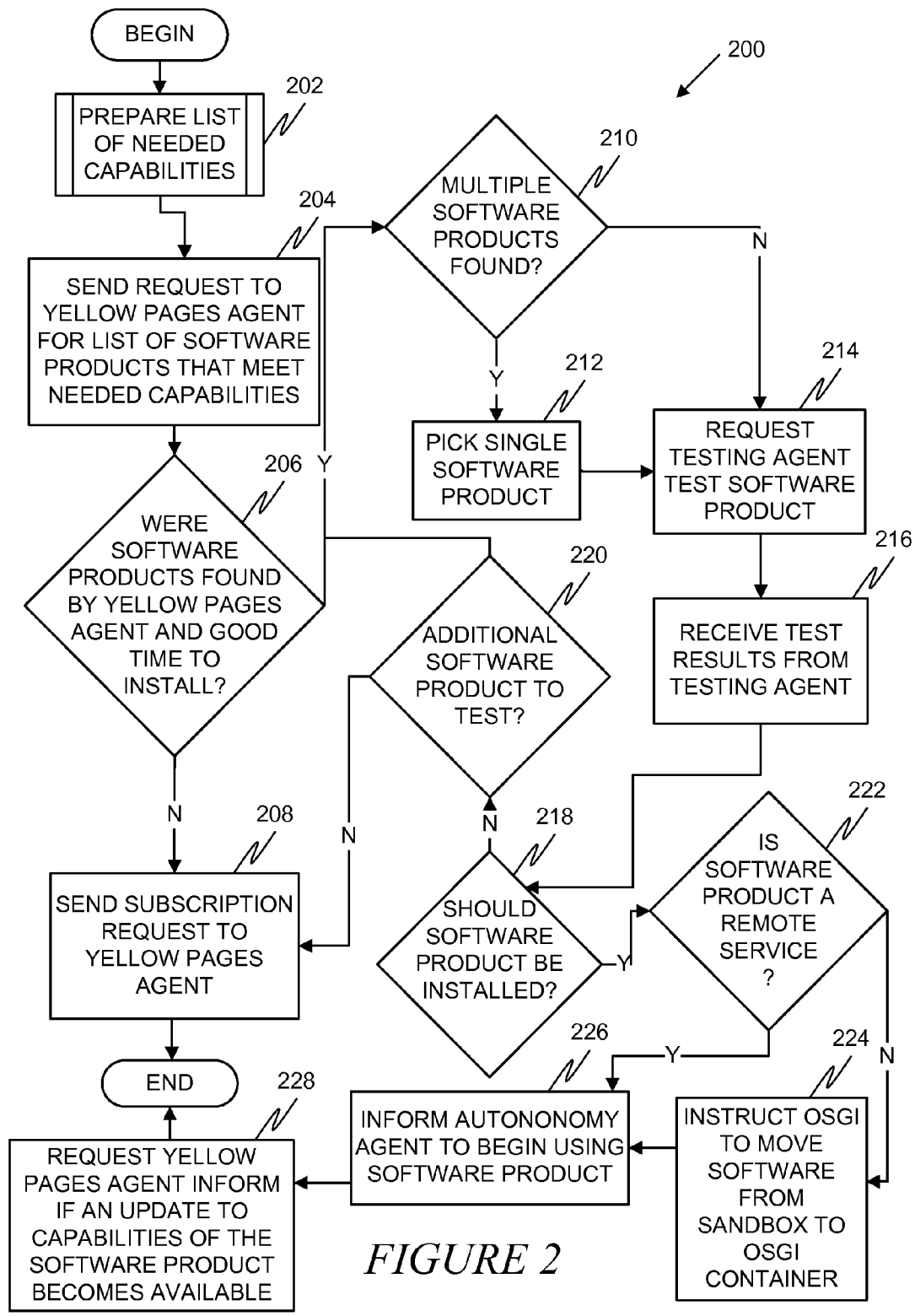
FIG. 2 is a flow diagram illustrating a method, in accordance with an example embodiment, for searching for and installing a software product on a device in accordance with an example embodiment.

FIG. 2 is a flow diagram illustrating a method 200, in accordance with an example embodiment, for searching for and installing a software product on a device in accordance with an example embodiment. At operation 202, a list of needed capabilities of the device (e.g., device 102 of FIG. 1) is prepared. In an example embodiment, this list may be prepared by an autonomy agent operating on the device. The autonomy agent may perform an analysis of the device including, for example, hardware capabilities of the device, operating system installed on the device, additional software installed on the device, settings configured by a user of the device, etc. The autonomy agent may also take into account additional factors such as specified desires by a user or users of the device (e.g., an indicated desire to obtain a word processing program) as well as various dynamically determined characteristics such as device location, environmental factors, other devices to which the device communicates, and any other factor that might affect a decision as to which type of software product would be appropriate for the device.

At operation 204, a request may be sent to a yellow pages agent (e.g., yellow pages agent 112) for a list of software products that meet the needed capabilities. In an example embodiment, operation 204 is performed by a software life cycle management agent (e.g., software life cycle management agent 106) operating on the device. It should be noted that the software products referred to may include aspects of a software product which may be considered by some to be services, for example, software as a service (SaaS)-type software where only a small portion of code is downloaded and installed on the device, with the bulk of the software functionality residing on external servers communicated with by the device, or may include more traditional software that is fully installed on the device itself prior to running. The request may include the list of needed capabilities prepared in operation 202. This list may be stored in accordance with, for example, a semantic language. It should be noted that in some example embodiments, the request may also include instructions to the yellow pages agent as to how to determine possible software products that have services that meet the needed capabilities. These instructions may include, for example, an indication on how stringent the yellow pages agent should be with regard to selecting the possible software product candidates. For example, the instructions may indicate that this particular device only wants to be presented with available software products that meet all of the listed needed capabilities. Alternatively, the instructions may indicate that this particular device desires to be presented with software product candidates that meet a certain number of the needed capabilities (the number exceeding a particular threshold specified in the instructions). In some example embodiments the instructions may be even more detailed, specifying weighting to be applied to each of the needed capabilities in the list and a threshold above which a software product candidate is to be recommended based on the weights, or the highest ranking such candidate.

At this point the yellow pages agent may or may not communicate a list of software products found that meet the requirements specified in the request in operation 204. It should be noted that in some example embodiments the software products found are somewhat anonymous, in that the yellow pages agent may just indicate a location where a candidate software product can be downloaded; however, in other embodiments, specific details about the candidate software product may be provided. In the case the yellow pages agent does communicate a list (of at least one software product), in an example embodiment this communication may be in the form of an "inform message" from the yellow pages. In other words, in some example embodiments the yellow pages agent may simply not respond to a request to which it can find no suitable software products. Nevertheless, at operation 206, it may be determined if software products were found by the yellow pages agent and if it is a good time to install one or more of the software products. Both of these conditions have to be true in order for a "yes" path from this operation to be followed. If either condition is not true, then the process may proceed to operation 208. At operation 208, a request may be sent to the yellow pages agent to inform the device if software product candidates matching the needed requirements become available in the future. In an example embodiment this may represent a "subscription" to future notifications of software products/updates. In an example embodiment, both operation 206 and operation 208 are performed by the software life cycle management agent.

The determination at operation 206 as to whether or not it is a good time to install one or more of the software products may be based on a number of different factors. In one example embodiment, these factors may include the current processing load on one or more processors of the device, current memory utilization, and/or current load on any other system resources of the device. In another example embodiment, additional analysis of past usage may help make certain predictions of future use of the device, which may influence whether or not now is a good time to install the software products. For example, it may be 3:55 pm now and system resources may be available to install the software products now, but the system may learn through analysis of past usage that the user typically runs a system resource heavy process from 4 pm-5 pm every day, and thus the system may determine that now would not be a good time to install the one or more software products. The system may also take into account predicted time to install the one or more software products, as well as the resources such installation are likely to tie up during the installation process.

It should be noted that the term "install" is intended to be interpreted broadly to cover all steps of installing (or determining not to install) a software product on the device. This includes the process of testing the software prior to installation and the process of determining, based on results of the testing (and possibly other factors as well), whether or not to install the software. Thus, at operation 206 (when it is being determined whether or not it is a good time to install one or more of the software products offered by the service providers) this analysis may take into account how long it will take to test the software products, determine if the software products should be placed in a non-sandbox area on the device, and the acts involved in actually placing the software products in the non-sandbox area on the device.

If at operation 206 it is determined that software products matching the needed capabilities were found by the yellow pages agent and it is a good time to install one or more of the software products found by the yellow pages agent, then the process may proceed to operation 210.

At operation 210, it may be determined if multiple software products were found by the yellow pages agent in response to the request. If so, then at operation 212 the system picks a single software product among the multiple software products. In an example embodiment, operation 212 may involve an analysis of many different factors, such as the level of trust between the device and the provider of the software product, the set of capabilities valued most by the device, previous experience with the provider of the software product, price of the software product, etc.

Once the single software product is selected, or if at operation 210 it was determined that multiple software products were not found by the yellow pages agent, then the process moves to operation 214 and the system may request that a testing agent test the selected software product. At operation 216, test results may be received from the testing agent. At operation 218, the test results may be utilized to determine whether to complete installation of the selected software product. This determination may be performed in a number of different ways. In one example embodiment, the test results include a binary determination of whether the software product "passed" or "failed" the testing. In such a case, operation 218 may involve accepting this binary determination and acting accordingly. In another example embodiment, a more detailed analysis may be determined based on the results of the testing. For example, the testing may produce a report that includes an indication of how various system resources were utilized during the testing, and the software life cycle management agent or autonomy agent may determine, based on this information and preset thresholds, whether or not the software should be installed. Additionally, performance information from the testing may also be included in this determination. For example, the software life cycle management agent or autonomy agent may allow a certain level of system resources to be utilized if particular performance thresholds are met, but not allow that level of system resource to be utilized if the performance thresholds are not met. Additionally, factors such as cost may be utilized in this determination as well. For example, the software life cycle management agent or autonomy agent may accept a certain performance level and a certain amount of system resources utilized if the cost of the software product is low, but may not accept them if the cost of the software product is high.

If it is determined at operation 218 that installation of the tested software product should not be completed, then at operation 220 it may be determined if there are any additional software products found by the yellow pages agent to test. If not, then the process may return to operation 208 and the yellow pages agent may be requested to inform the software life cycle management agent if software product(s) matching the needed capabilities are found in the future. If it is determined at operation 220 that there are additional software products found by the yellow pages agent to test, then the process may return to operation 210.

If it is determined at operation 218 that the installation of the tested software product should be completed, then at operation 222 it is determined if the software product is a remote service. If not, then at operation 224 OSGi may be instructed to move the software from the sandbox to an OSGi container from which installation can be completed. Then at operation 226 the autonomy agent can be informed to begin using the software and store information about the software in a software inventory database. If at operation 222 it is determined that the software product is a remote service, then operation 224 may be skipped and the process may move directly to operation 226. Finally, at operation 228, the yellow pages agent may be requested to inform the software life cycle management agent if an update to the capabilities of the software product becomes available in the future (either by, for example, an updated version of the software product, or by a competitor software product).

As described earlier, one of the factors that may be considered by the system in operation 212 is the level of trust of the service provider distributing the software product. This characteristic may also be a factor in operation 218 as well. There are a number of different mechanisms by which a system can determine a level of trust. Information relevant to a trust determination can come from a number of different sources, such as direct interaction (one's own experience working with the service provider), direct observation (acting as a third party and observing behavior of the service provider with others), witness information (reports from others on their interactions), sociological information (based on the role the service provider plays in society and judging behavior based on that rather than specific interaction), and prejudice (the assignment of a property to an individual based on some specific feature that allows it to be considered as part of a group that has the property). One characteristic that might be of concern is whether the service provider leaks information learned from the deployment of the software product on a device to users or entities not in control of the device. This is of particular concern with regards to so-called "spyware" which is software that may be installed intentionally by a user without the user realizing that it gathers and leaks information about the user and/or user's device.

One mechanism to detect such leaks is running the software product in a sandbox on the device and performing tests specifically to detect leaks. This activity could be expanded to include artificial compatriots to test the fidelity of the software product with respect to contractually agreed limits on retention or use of information. However, this solution may not detect a condition where the software product is written to behave normally until or unless a particular (non-present) agent initiates communication to begin the leak process.

One solution would be to run the software product on a known trusted server that has sandboxing capabilities which allow for remote testing and examination of the agent. As such, in an example embodiment, the testing of the software product installed in the sandbox of the device may be expanded to include testing and/or analysis of testing performed on the software product in a sandbox of another device, such as a server (although embodiments are possible where information is obtained from other devices similar to the device in question).

In an example embodiment, trust may be represented using a combined trust model. In a combined trust model, trust characteristics are modeled across multiple dimensions, such as quality, cost, likelihood of success, and timeliness. Trust can be updated based on interactions with the software product and/or service provider, and can also be based on reputation (e.g., the reported trust score from some other agent that has interacted with the software product and/or service provider).

Figure 3:
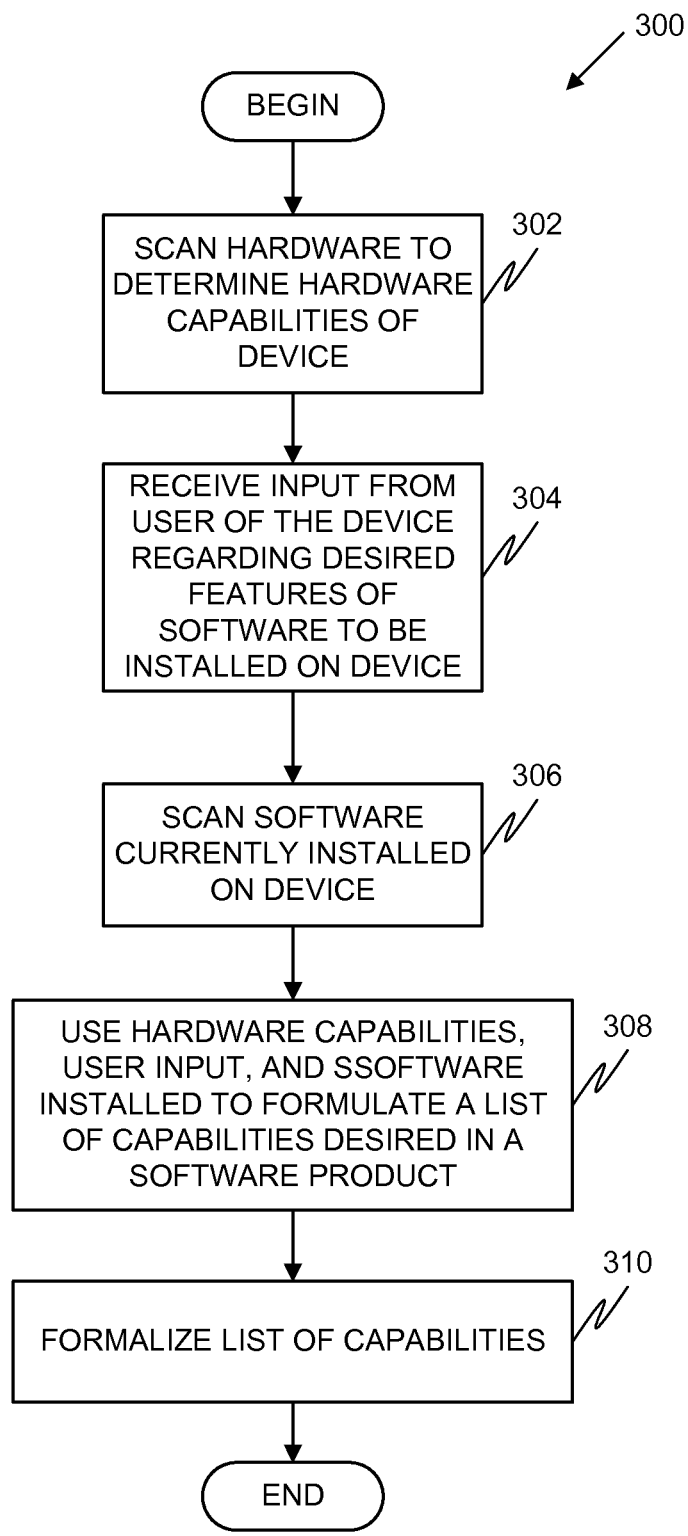
FIG. 3 is a flow diagram illustrating a method, in accordance with an example embodiment, for preparing a list of needed capabilities of a device.

FIG. 3 is a flow diagram illustrating a method 300, in accordance with an example embodiment, for preparing a list of needed capabilities of a device. In an example embodiment, this diagram may illustrate operation 202 of FIG. 2 in more detail, although in other embodiments a different process may be used to perform operation 202 of FIG. 2.

At operation 302, hardware of the device is scanned to determine hardware capabilities of the device. This may include examining, for example, processing power (e.g., central processing unit (CPU) type and speed, graphical processing unit (GPU) type and speed, etc.), memory capacity, memory speed, display type and size, user input capabilities (e.g., mouse, keyboard, touchpad, microphone, webcam, etc.), speaker type and parameters, and any other hardware information that may be relevant to a determination of capabilities of the device. At operation 304, input may be received from a user of the device regarding desired features of software to be installed on the device. For example, a user may specify a desire for a word processing program.

At operation 306, software currently installed on the device may be scanned. This may include, for example, an operating system and any applications installed on the device. The system may learn, for example, the operating system type and version, and the fact that certain types of software are already installed on the device. Additional information, such as configuration settings and other run-time variables, may be gleaned during this scan as well.

At operation 308, hardware capabilities, user input, and software installed on the device are utilized in order to formulate a list of capabilities desired in a software product. This list at this point may be informal. At operation 310, the list of capabilities is formalized by, for example, storing it in a semantic language where the format of the language allows for the storage of "needs" of a system.

Figure 4:
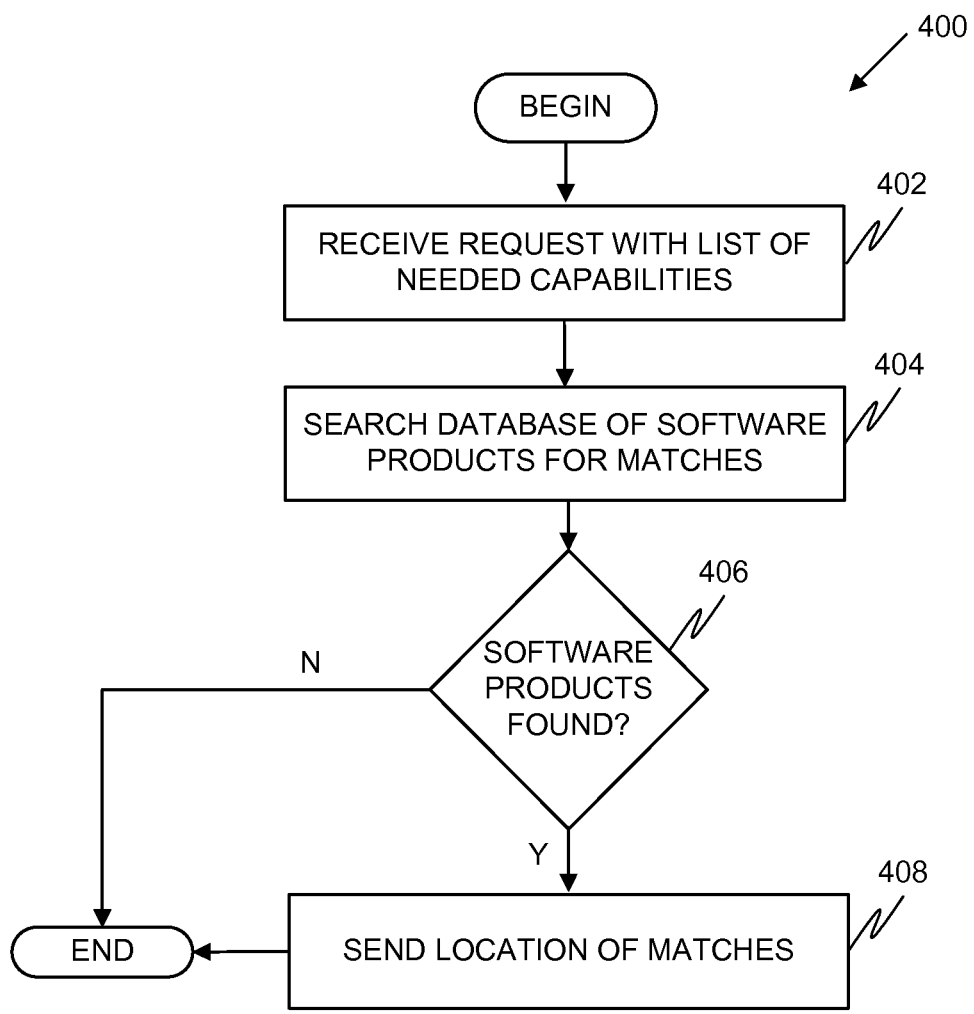
FIG. 4 is a flow diagram illustrating a method, in accordance with an example embodiment, for finding matching software products at a yellow pages agent.

FIG. 4 is a flow diagram illustrating a method 400, in accordance with an example embodiment, for finding matching software products at a yellow pages agent. This method 400 may be performed by a yellow pages agent in between operations 204 and 206 of FIG. 2. At operation 402, a request containing a list of needed capabilities is received from a software life cycle management agent. At operation 404, a database of software products is searched for one or more software products matching the needed capabilities. In an example embodiment, the request from the software life cycle management agent includes an indication of criteria to be used to identify matching software products. For example, the criteria may include a threshold level of how many matching capabilities are needed in order for the yellow pages agent to determine that a match occurs. If the request contains such an indication of criteria, this indication of criteria may be utilized by the yellow pages agent in searching the database. The database itself may be organized in a manner that allows for efficient searching based on capability. For example, a directory of the database may be maintained that includes a mapping of capabilities to various software products stored in the database. At operation 406, it is determined if there are software products matching the needed capabilities. If so, then at operation 408, a location of the software products matching the needed capabilities is transmitted to the software life cycle management agent. If not, the process may end.

Figure 5:
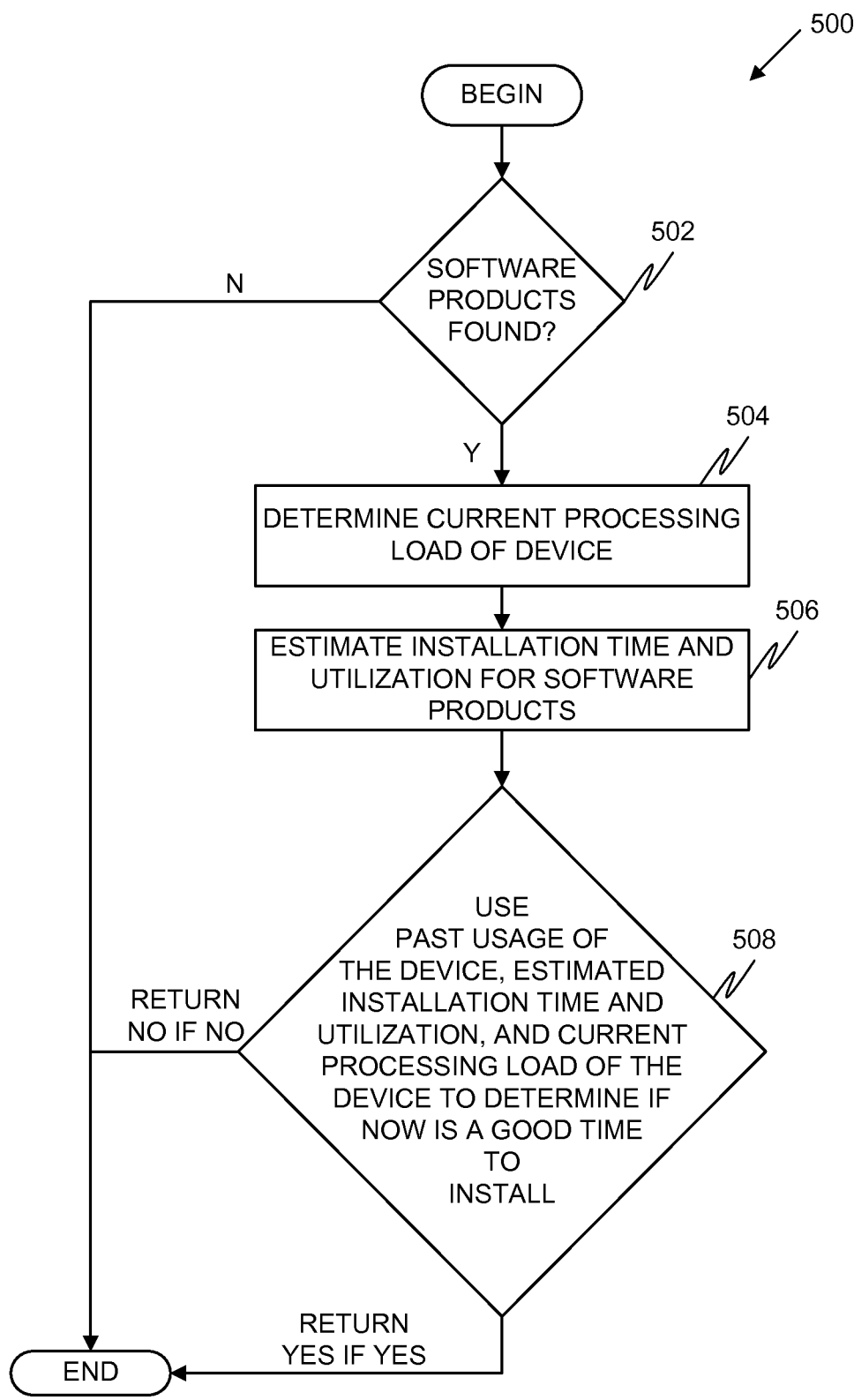
FIG. 5 is a flow diagram illustrating a method, in accordance with an example embodiment, for determining that software products matching the needed capabilities were found by the yellow pages agent and that it is a good time to install one or more of the software products found by the yellow pages agent.

FIG. 5 is a flow diagram illustrating a method 500, in accordance with an example embodiment, for determining that software products matching the needed capabilities were found by the yellow pages agent and that it is a good time to install one or more of the software products found by the yellow pages agent. In an example embodiment, this method 500 represents operation 206 of FIG. 2 in more detail. At operation 502, it is determined if software products matching the needed capabilities were found by the yellow pages agent. If not, then method 500 ends and a "No" is returned. If so, then at operation 504, the current processing load of the device is determined. This may include scanning current CPU, GPU, and memory utilization, for example. At operation 506, an estimated installation time and utilization (e.g., how much processing and memory usage is needed for installation) for each of the software products is determined. At operation 508, past usage of the device, the estimated installation time and utilization, and the current processing load of the device is utilized in a determination of whether or not now is a good time to install one or more of the software products. If now is not a good time, then the method 500 ends and a "No" is returned. If now is a good time, then the method 500 ends and a "Yes" is returned.

Figure 6:
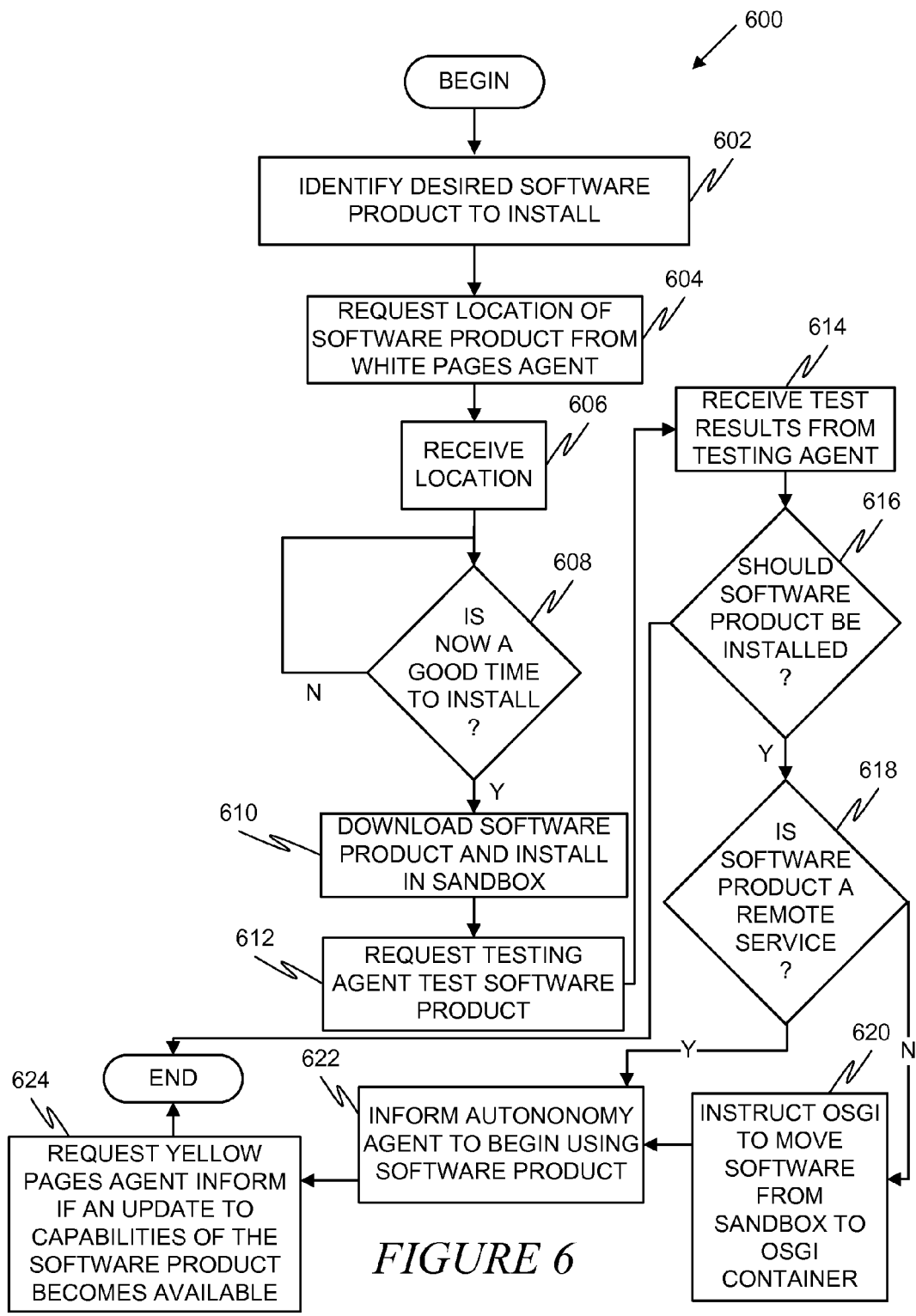
FIG. 6 is a flow diagram illustrating a method, in accordance with an example embodiment, of installing a software product using a white pages agent.

FIG. 6 is a flow diagram illustrating a method 600, in accordance with an example embodiment, of installing a software product using a white pages agent. At operation 602, a desired software product to install is identified. This may be performed in a number of different ways. In one example embodiment, a user may specify the desire to download a particular software product. In another example embodiment, an updated version of a currently installed software product on the device is identified. In another example embodiment, the system may scan the device and determine on its own what software product would be appropriate to install. At operation 604, the location of the desired software product is requested from a white pages agent. At operation 606, the location of the desired software product is received from the white pages agent. At operation 608, it is determined if now is a good time to install the white pages agent. This operation may be similar to operation 206 of FIG. 2 and method 500 of FIG. 5, with the exception of the lack of a need to determine whether one or more matching software products were found.

If it is determined that now is a good time to install the software product, then at operation 610 the software product is downloaded and stored in a sandbox on the device. If not, then the process loops back to operation 608 until it is a good time to install the software product. At operation 612, the system may request that a testing agent test the software product. At operation 614, test results may be received from the testing agent. At operation 616, the test results may be utilized to determine whether to complete installation of the software product. This determination may be performed in a number of different ways. In one example embodiment, the test results include a binary determination of whether the software product "passed" or "failed" the testing. In such a case, operation 616 may involve accepting this binary determination and acting accordingly. In another example embodiment, a more detailed analysis may be determined based on the results of the testing. For example, the testing may produce a report that includes an indication of how various system resources were utilized during the testing, and the software life cycle management agent or autonomy agent may determine, based on this information and preset thresholds, whether or not the software should be installed. Additionally, performance information from the testing may also be included in this determination. For example, the software life cycle management agent or autonomy agent may allow a certain level of system resources to be utilized if particular performance thresholds are met, but not allow that level of system resource to be utilized if the performance thresholds are not met. Additionally, factors such as cost may be utilized in this determination as well. For example, the software life cycle management agent or autonomy agent may accept a certain performance level and a certain amount of system resources utilized if the cost of the software product is low, but may not accept them if the cost of the software product is high.

If it is determined at operation 616 that installation of the tested software product should not be completed, then the process ends. Otherwise, at operation 618 it is determined if the software product is a remote service. If not, then at operation 620 OSGi may be instructed to move the software from the sandbox to an OSGi container from which installation can be completed. Then at operation 622 the autonomy agent can be informed to begin using the software and store information about the software in a software inventory database. If at operation 618 it is determined that the software product is a remote service, then operation 620 may be skipped and the process may move directly to operation 622. Finally, at operation 624, the yellow pages agent may be requested to inform the software life cycle management agent if an update to the capabilities of the software product becomes available in the future (either by, for example, an updated version of the software product, or by a competitor software product).

Figure 7:
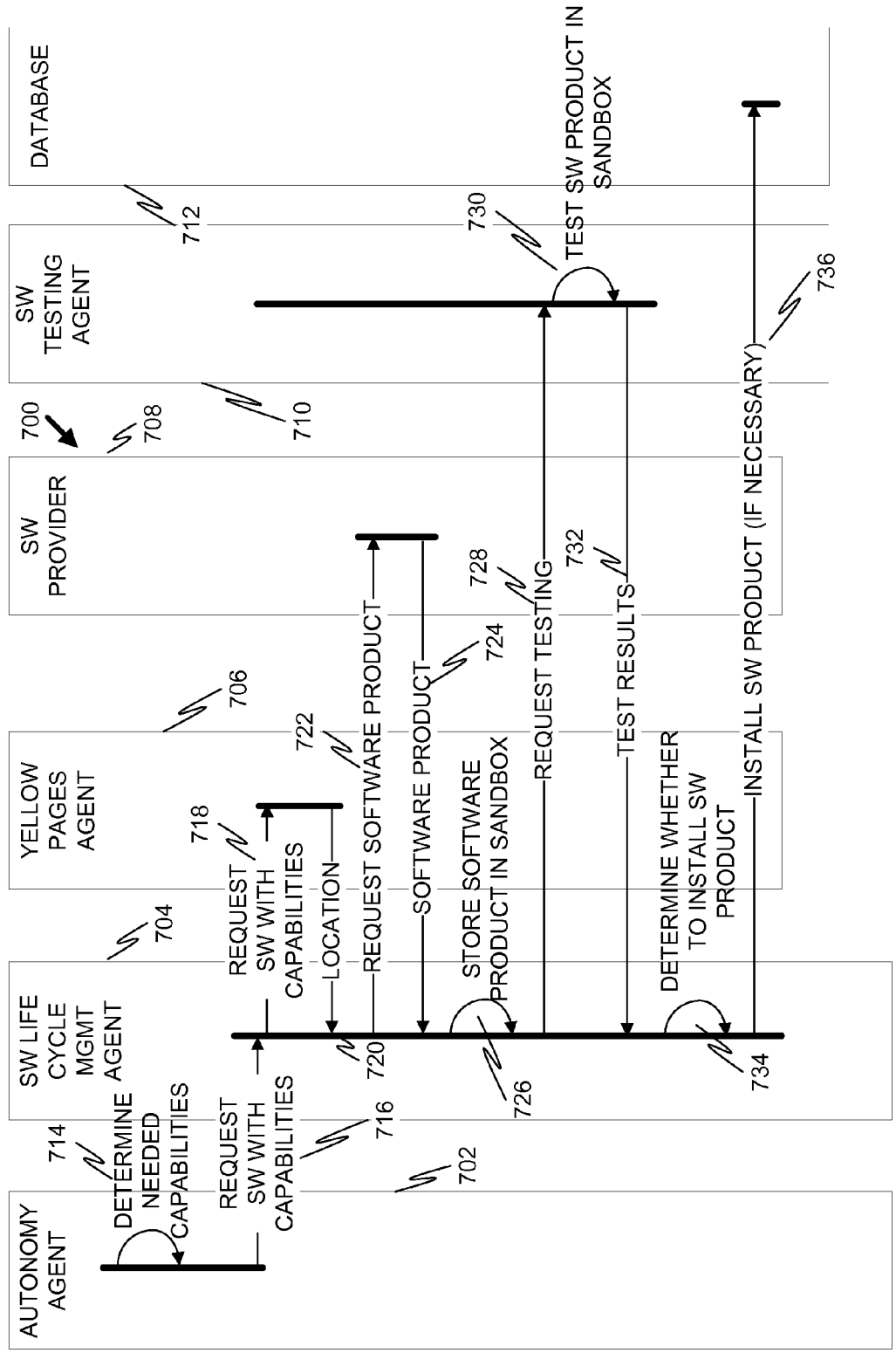
FIG. 7 is a sequence diagram illustrating a method, in accordance with an example embodiment, for searching for and installing a software product on a device in accordance with an example embodiment.

FIG. 7 is a sequence diagram illustrating a method 700, in accordance with an example embodiment, for searching for and installing a software product on a device in accordance with an example embodiment. The method 700 may utilize an autonomy agent 702, software life cycle management agent 704, yellow pages agent 706, software provider 708, software testing agent 710, and database 712. At operation 714, the autonomy agent 702 may determine needed capabilities of a device. At operation 716, the autonomy agent 702 may send a request for software with the capabilities to the software life cycle management agent 704. At operation 718, the software life cycle management agent 704 may request a software product with the capabilities from the yellow pages agent 706. The yellow pages agent 706 may respond with a location at operation 720.

At operation 722, the software life cycle management agent 704 may request the software product from the software provider 708 using the location. At operation 724 the software product is returned. At operation 726, the software life cycle management agent 704 may store the software product in a sandbox. At operation 728, the software life cycle management agent 704 may request testing on the software product by the software testing agent 710. The software testing agent 710 may then test the software product in the sandbox at operation 730, and then return the results at operation 732.

At operation 734, the software life cycle management agent 704 may determine whether to install the software product based, at least partially, on the test results. At operation 736, if the software product is to be installed, the software product is installed to the database 712.

Example Mobile Device

Figure 8:
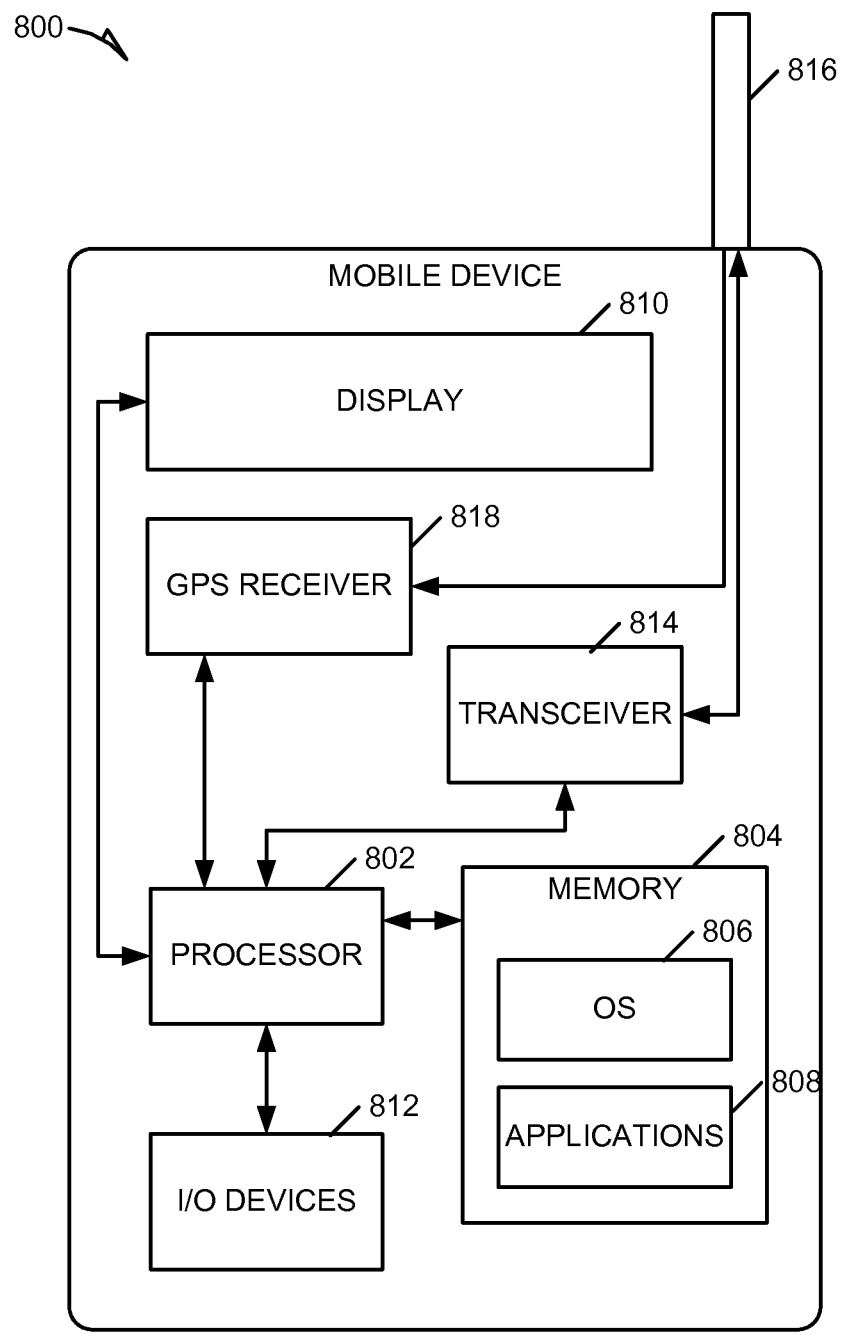
FIG. 8 is a block diagram illustrating a mobile device, according to an example embodiment.

FIG. 8 is a block diagram illustrating a mobile device 800, according to an example embodiment. The mobile device 800 can include a processor 802. The processor 802 can be any of a variety of different types of commercially available processors suitable for mobile devices 800 (for example, an XScale architecture microprocessor, a Microprocessor without Interlocked Pipeline Stages (MIPS) architecture processor, or another type of processor). A memory 804, such as a random access memory (RAM), a Flash memory, or other type of memory, is typically accessible to the processor 802. The memory 804 can be adapted to store an operating system (OS) 806, as well as application programs 808, such as a mobile location-enabled application that can provide location-based services (LBSs) to a user. The processor 802 can be coupled, either directly or via appropriate intermediary hardware, to a display 810 and to one or more input/output (I/O) devices 812, such as a keypad, a touch panel sensor, a microphone, and the like. Similarly, in some embodiments, the processor 802 can be coupled to a transceiver 814 that interfaces with an antenna 816. The transceiver 814 can be configured to both transmit and receive cellular network signals, wireless data signals, or other types of signals via the antenna 816, depending on the nature of the mobile device 800. Further, in some configurations, a GPS receiver 818 can also make use of the antenna 816 to receive GPS signals.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is tangible unit capable of performing certain operations and can be configured or arranged in a certain manner. In example embodiments, one or more computer systems (e.g., a standalone, client or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple such hardware-implemented modules exist contemporaneously, communications can be achieved through signal transmission (e.g., over appropriate circuits and buses) that connect the hardware-implemented modules. In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one of processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., application program interfaces (APIs).)

Electronic Apparatus and System

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of description language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Example Machine Architecture and Machine-Readable Medium

Figure 9:
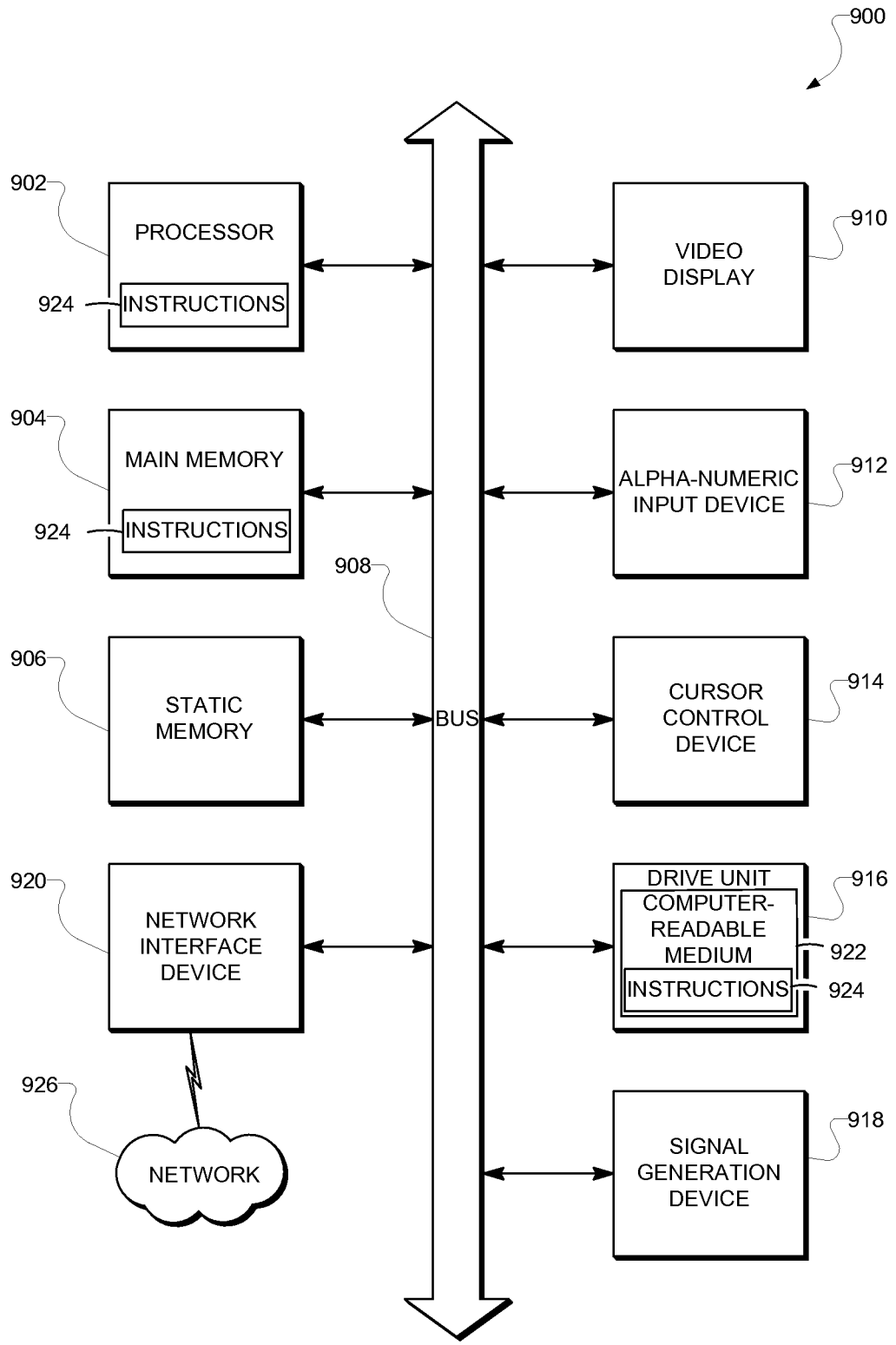
FIG. 9 is a block diagram of a machine in the example form of a computer system within which instructions may be executed for causing the machine to perform any one or more of the methodologies discussed herein.

FIG. 9 is a block diagram of a machine in the example form of a computer system 900 within which instructions 924 may be executed to cause the machine to perform any one or more of the methodologies discussed herein. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904 and a static memory 906, which communicate with each other via a bus 908. The computer system 900 can further include a video display unit 910 (e.g., a liquid crystal display (LCD) or a cathode ray tube (CRT)). The computer system 900 also includes an alpha-numeric input device 912 (e.g., a keyboard or a touch-sensitive display screen), a user interface (UI) navigation (or cursor control) device 914 (e.g., a mouse), a disk drive unit 916, a signal generation device 918 (e.g., a speaker), and a network interface device 920.

Machine-Readable Medium

The disk drive unit 916 includes a machine-readable medium 922 on which is stored one or more sets of data structures and instructions 924 (e.g., software) embodying or utilized by any one or more of the methodologies or functions described herein. The instructions 924 can also reside, completely or at least partially, within the main memory 904 and/or within the processor 902 during execution thereof by the computer system 900, with the main memory 904 and the processor 902 also constituting machine-readable media 922.

While the machine-readable medium 922 is shown in an example embodiment to be a single medium, the term "machine-readable medium" can include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions 924 for execution by the machine and that cause the machine to perform any one or more of the methodologies of the present disclosure, or that is capable of storing, encoding or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 can be transmitted or received over a communications network 926 using a transmission medium. The instructions 924 can be transmitted using the network interface device 920 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

This written description uses examples to disclose the inventive subject matter, including the best mode, and also to enable any person skilled in the art to practice the inventive subject matter, including making and using any devices or systems and performing any incorporated methods. The patentable scope of the inventive subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of searching for and installing a software product on a device, the method comprising:
   identifying one or more capabilities needed by the device to be served by a software product;
   communicating the one or more capabilities needed by the device from a software life cycle management agent on the device to one or more yellow pages agents outside the device, the communicating comprising formulating a request comprising a list of the capabilities encoded in a description language that defines the capabilities semantically, the request further including instructions as to how to determine possible software products having traits matching the needed capabilities, the instructions include a threshold indicating a number of needed capabilities that should be met by any software product the one or more yellow pages agents determine to be a match for the needed capabilities;
   receiving locations of one or more software products matching the one or more capabilities needed by the device from the one or more yellow pages agents;
   selecting one of the one or more software products to install based on automatically evaluated criteria;
   downloading the selected software product using its received location; and
   installing the selected software product on the device.

2. The method of claim 1, wherein the identifying includes scanning the device to determine hardware capabilities of the device.

3. The method of claim 1, wherein the identifying includes scanning the device to determine an operating system installed on the device.

4. The method of claim 1, wherein the installing the selected software product on the device further includes:
installing the selected software product in a sandbox on the device;
performing testing of the selected software product in the sandbox; and
determining, based on the testing, whether to complete installation of the selected software product on the device.

5. The method of claim 1, wherein the installing is performed only after a determination is made that it is a good time to install the selected software product, wherein the determination that it is a good time to install the selected software product is based on an analysis of current resource utilization in the system.

6. A device comprising:
an autonomy agent, comprising one or more processors, configured to identify one or more capabilities needed by the device to be served by a software product;
a software inventory database;
a software life cycle management agent configured to:
communicate the one or more capabilities needed by the device from a software life cycle management agent on the device to one or more yellow pages agents outside the device, the communicating comprising formulating a request comprising a list of the capabilities encoded in a description language that defines the capabilities semantically, the request further including instructions as to how to determine possible software products having traits matching the needed capabilities, the instructions include a threshold indicating a number of needed capabilities that should be met by any software product the one or more yellow pages agents determine to be a match for the needed capabilities;
receive locations of one or more software products matching the one or more capabilities needed by the device from the one or more yellow pages agents;
select one of the one or more software products to install based on automatically evaluated criteria;
download the selected software product using its received location; and
install the selected software product on the device by storing information about the software product in the software inventory database.

7. The device of claim 6, wherein the information about the software product includes an Open Service Gateway Initiative (OSGi) container.

8. The device of claim 6, further comprising:
a sandbox; and
a software testing agent,
wherein the software life cycle management agent is further configured to install the selected software product in the sandbox and request the software testing agent to test the selected software product,
wherein the software testing agent is configured to test the selected software product in the sandbox, and
wherein the software life cycle management agent is further configured to determine, based on the testing, whether to complete installation of the selected software product on the device.

9. The device of claim 6, wherein the identifying includes scanning the device to determine hardware capabilities of the device.

10. The device of claim 6, wherein the identifying includes scanning the device to determine an operating system installed on the device.

11. A non-transitory machine-readable storage medium comprising instructions, which when implemented by one or more machines, cause the one or more machines to perform operations for searching for and installing a software product on a device, the operations comprising:
communicating one or more capabilities needed by the device from a software life cycle management agent on the device to one or more yellow pages agents outside the device, the communicating comprising formulating a request comprising a list of the capabilities encoded in a description language that defines the capabilities semantically, the request further including instructions as to how to determine possible software products having traits matching the needed capabilities, the instructions include a threshold indicating a number of needed capabilities that should be met by any software product the one or more yellow pages agents determine to be a match for the needed capabilities;
receiving locations of one or more software products matching the one or more capabilities needed by the device from the one or more yellow pages agents;
selecting one of the one or more software products to install based on automatically evaluated criteria;
downloading the selected software product using its received location; and
installing the selected software product on the device.

12. The non-transitory machine-readable storage medium of claim 11, wherein the identifying includes scanning the device to determine hardware capabilities of the device.

13. The non-transitory machine-readable storage medium of claim 11, wherein the identifying includes scanning the device to determine an operating system installed on the device.

14. The non-transitory machine-readable storage medium of claim 11, wherein the installing the selected software product on the device further includes:
installing the selected software product in a sandbox on the device;
performing testing of the selected software product in the sandbox; and
determining, based on the testing, whether to complete installation of the selected software product on the device.

* * * * *